Figure 1:
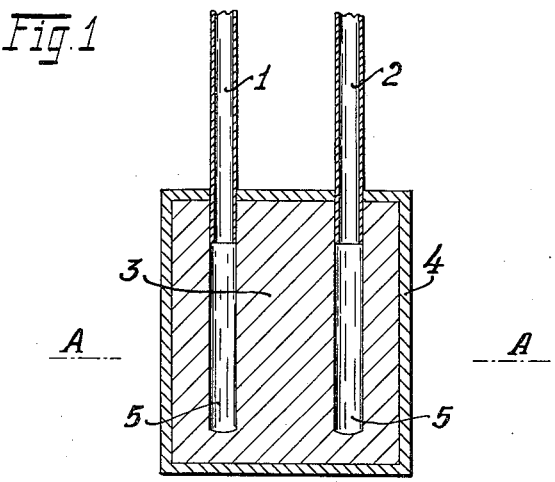

May 22, 1962     R. SOMMER ET AL     3,035,998
MULTI-PURPOSE ELECTRODE FOR ELECTROCHEMICAL PROCESSES
Filed April 28, 1958

INVENTORS
BY Rudolf Sommer
Heinrich Müller
ATTYS.

United States Patent Office 3,035,998
Patented May 22, 1962

3,035,998
MULTI-PURPOSE ELECTRODE FOR ELECTRO-CHEMICAL PROCESSES
Rudolf Sommer and Heinrich Müller, Vienna, Austria, assignors to Siemens & Halske Gesellschaft m.b.H., Vienna, Austria, a firm
Filed Apr. 28, 1958, Ser. No. 731,476
Claims priority, application Austria May 8, 1957
3 Claims. (Cl. 204—284)

A large number of different types of electrodes for electrochemical processes are known. Apart from soluble electrodes as are used in primary elements, in electrodepositing processes and in the electrolytic refining of metals, there are so-called inert electrodes, on which reducing and oxidizing operations occur as a result of a flow of electric current therethrough.

Electrodes having a large surface are used to facilitate these processes as regards the supply of the substances which interreact on the electrodes and the phenomenon of overvoltage. For instance, the surface of the electrodes used for the electrolytic decomposition of water is increased by sand blasting, by the formation of rough metal deposits on or by the dissolution of portions out of the electrode whereas carbon electrodes which are depolarized with air have finest pores, in which the depolarization takes place. The oxygen and hydrogen electrodes of the fuel elements, which consist of finely porous materials and which may have to receive gas under high pressure (several kg./sq. cm. above atmospheric pressure) are similar to carbon electrodes in construction and effectiveness.

It is believed that the disadvantages of such electrodes are readily appreciated. Whereas a rough surface will reduce the overvoltage at the electrodes, it will do so only to a very limited extent. Besides, the electrodes still form a discharge surface which permit any gas which has been developed to rise in the surrounding electrolyte, whereby the performance of electrochemical processes is often greatly disturbed. On the other hand, the effect of gas-depolarized, finely porous electrodes of the usual type around which gas flows will depend on the diffusion rates of the gas and liquid components; in the case of electrodes through which the gas flows, the gas has again a disturbing effect on the electrolyte and losses of gas and energy are inevitable.

A special form of electrodes are the so-called conveying electrodes, one type of which has been disclosed in connection with the alkali chloride electrolysis with solid electrodes. In this process the hydrogen which is developed carries the electrolyte out of the cell through an additional gas conduit disposed above the electrode; this causes at the same time the flow of the electrolyte required in the process.

It is an object of the invention to provide a multi-purpose electrode, which combines all advantages of the described electrodes and which has additional desirable properties, which are of great importance for its use as a cathode or inert anode.

According to the invention the core of the electrode consists of conductor or semiconductor particles and is mainly or entirely provided with a firmly adhering, e.g., sintered covering of electrically conducting or non-conducting material, which covering has pores, the mean diameter of the pores being smaller than the mean diameter of the interstices between the particles of which the core of the electrode is composed.

The electrode has a large surface and can be depolarized provided that a suitable material is used; its interior is gas-permeable so that gas can be caused to flow therethrough without any introduction of gas into the electrolyte. This will avoid disturbances of the desired electrochemical processes in the electrolyte surrounding the electrode. Moreover, gases and liquids may be supplied to the core of the electrode and these gases and liquids and their reaction products may be withdrawn out of the core without contacting the electrolyte which surrounds the electrode. The electrochemical and secondary chemical reactions are confined to the core of the electrode whereas the covering may be constructed and consist of an appropriate material to act as a diaphragm or filter.

The electrode according to the invention consists of a core and a covering. The core consists of conductors and/or semiconductors for electric current in the form of solid particles, which are preferably of approximately equal size, e.g. in the form of spheres so as to leave interstices between the particles. The particles are suitably of such a size that they leave pores which permit a flow of gas under a pressure of less than 1 kg./sq. cm. above atmospheric pressure through the core when the same is wetted by and filled with liquid.

In the manufacture of such electrode cores it has been found desirable to compose them of minute, compact metal particles, the size of which does not exceed 1 micron to about 300 microns at least in the direction of one of the three coordinates and to dimension and distribute the interstices which remain free between these particles so that gas can flow through the electrode under a pressure of only 0.05 to 0.3 kg./sq. cm. above atmospheric pressure.

Whereas the shape of the small particles forming the core of the electrode is unimportant as such, it has proved desirable to use starting particles of filamentous or another regular shape, of equal size in at least two dimensions, in order to obtain more uniform interstices and a regular distribution thereof.

The covering is passed through by capillary spaces which are substantially so fine that liquid can be expelled therefrom only under a pressure which is higher than the pressure required for the flow of gas through the core so that the covering is permanently filled with liquid (drowned) and will even feed liquid to the core of the electrode, whence the liquid can be carried out of the electrode with the aid of gas under a low superatmospheric pressure owing to the width of the interstices remaining in the core.

Particularly favourable results will be obtained if the interstices in the core, on the one hand, and in the covering, on the other hand, are of equal size. This can be achieved, e.g., by using particles which have as far as possible the same size and maintaining the temperature as constant as possible throughout the sintering operation.

In order to enable such an electrode to be fed with liquid and/or gaseous reagents, which are consumed or effective in the electrode to produce electrochemical, chemical, catalytic or merely physical effects, e.g., as depolarizers, solvents and the like, these reagents are fed to the core through passages or conduits which extend through the covering. In order to ensure a uniform distribution of the reagents throughout the volume of the core the latter is preferably provided with passages which extend in any desired length through the core in the longitudinal direction of the covering or transversely thereto. A similar or identical system of passages is preferably arranged in the electrode in order to discharge liquids or gases from the electrode unless it is preferred to permit the reagents to flow directly into the electrolyte of the cell through openings in the covering. In the manufacture of very large electrodes the path of the reagents through the core of the electrode may be shortened as desired, e.g., if the feeding and discharge passengers of the core intermesh like combs while maintaining any desired spacing between a feeding passage and a discharge passage.

Figure 2:
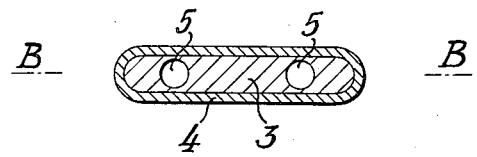

An illustrative embodiment of a multi-purpose electrode according to the invention is shown in the drawing in FIG. 1 in a vertical sectional view taken on line B—B of FIG. 2 and in FIG. 2 in a horizontal sectional view taken on line A—A of FIG. 1.

With reference to the drawing, the multi-purpose electrode comprises a core 3 consisting of relatively large particles assembled with relatively large interstices, and a covering 4 consisting of relatively small particles with capillary pores, the mean diameter of which is less than the mean diameter of the interstices of the core 3. The core is formed with two parallel spaced passages 5, one of which communicates with a feed conduit 1, the other with a dicharge conduit 2. These conduits extend through the covering 4 and terminate in the core and serve for feeding and withdrawing fluids to and from the core.

This electrode may be manufactured by the following procedure: First the core of the electrode is produced by sintering copper powder. To this end, copper powder having a particle size of 90–120 microns is introduced into an iron mold. The gas inlet and outlet passages are provided for by the insertion of graphitized iron rods in the mold. The mold is vibrated to fill it as completely as possible with copper powder, which is then formed into a rigid body by a sintering treatment at 980° C. continued for one hour. After the core of the electrode has been removed from the mold and the iron rods have been pulled out of the core the gas feeding and discharge system is provided with the aid of iron or copper tubes inserted into the passages of the core. Then the core with the conduits is placed into a somewhat larger iron mold and is surrounded with finer copper powder having a particle size of 0–30 microns so that the core of the electrode is surrounded on all sides by a fine powder layer about 1 mm. thick. A second sintering treatment continued for one hour at a temperature of 920°–940° C. will consolidate the covering and cause it to adhere to the core.

An active electrode as described hereinbefore can easily be recognized by breaking the electrode apart and inspecting it with magnification. A relatively thick core of sintered copper particles is surrounded by a distinct fine-grained covering. An electrode which has been used has a dark core and a brick red covering.

The operation of electrodes thus constructed may be in accordance with entirely new aspects. For instance, a gaseous depolarizer may be forced through the coarse-grained core of the electrode and/or sucked out of the same. The direction of flow of the gas is preferably parallel or substantially parallel to the finely porous covering. This results in a greatly increased utilization of the gas in a single pass through the electrode and in a consumption of gas which is not substantially higher than the theoretical requirement.

A special case is an electrode the core of which consists of electrical conductors which are coated or covered in operation with a semiconductor layer, which has an electrochemical, chemical, catalytic or physical activity to promote the operation of the electrode.

Two examples are given to illustrate the mode of operation of such a multi-purpose electrode.

(1) Use as an anode for the regeneration of sulfuric acid solutions of chromium sulfate to form sulfuric acid solutions of chromic acid and chromium sulfate. The electrolytic cell consists of a stoneware trough, in which stainless steel cathodes are associated with multi-purpose electrodes. Both types of electrodes are vertically arranged and closely spaced. The cell is supplied with a solution of chromium sulfate in sulfuric acid. In this case the core of the multi-purpose electrode consists of sintered fine lead shot and the covering of the electrodes consists of plastic powder, e.g., polyvinylchloride powder, which is sintered on the core.

The application of a D.C. voltage to these electrodes causes hydrogen to develop on the cathodes. This hydrogen escapes freely through the chromium sulfate solution without decreasing the current efficiency by a reducing action. Chromic acid and some oxygen are formed at the lead surfaces of the core of the anode. The anodic product is withdrawn separately from the electrolyte simply by feeding air under a slightly superatmospheric pressure to the feeding passages of the electrode. This air flowing through the material of the core and in addition thereto the oxygen which has been liberated in the electrode feed the solution of chromic acid and chromium sulfate towards the discharge system and through the same out of the electrode and consequently out of the cell like a mammoth pump.

The advantages of this arrangement will be readily appreciated. On the one hand, the current density on the anode is very small owing to the extremely large active surface of the core of the anode. For this reason the corrosion of the electrode material is negligible. On the other hand, the covering acts as a diaphragm and prevents the chromic acid from being reduced by the hydrogen developed on the cathode. Finally, any desired electrolyte flow from the cathode to the anode is maintained and can easily be controlled by the supply of air to the anode.

(2) Use as an oxygen-depolarized electrode in primary elements or fuel chains.

A soluble electrode, consisting, e.g., of zinc, or any hydrogen electrode in an alkaline electrolyte is connected to a multi-purpose electrode, the core of which consists of sintered copper particles having an average diameter of 60 microns. The covering is sintered on the core and consists of the same metal but of a particle size which is preferably less than 30 microns. When oxygen is caused to flow through this electrode, no oxygen will appear in the electrolyte; there is no impoverishment as may occur in the case of diffusion electrodes resulting from the presence of inert gases with the oxygen; the electrolyte flows continuously through the electrode so that there can be no change in the concentration of the electrolyte inside and outside of the electrode, and unused gas can easily be collected and can be reused after it has been separated from the entrained electrolyte.

It is understood that a similarly constructed electrode consisting of other suitable materials, such as nickel, may be used to advantage as a hydrogen electrode.

It is known that the migration of ions in electrolytic processes causes variations in the concentration of the electrolyte. Because in the operation of the multi-purpose electrode described hereinbefore the transfer of electrons is effected on the surface of the coarse grains of the core of the electrode the migration of the ions extends as far as into the interior of the electrode. The outer layer, through which gas does not flow and/or which is non-conducting remains ineffective, of course. For this reason it appears desirable to remove any electrode products, e.g. sodium hydroxide solution formed at the cathode or sulfuric acid formed on the anode out of the cell through the core of the electrode. In accordance with the adjusted rate of conveyance of liquid effected by the electrode more or less concentrated solutions may be obtained as desired.

The conveyance of liquid may be controlled as desired if the special conditions of operation of the electrode are observed. The porous electrode body will automatically be soaked with electrolyte by capillary action. The flow of gas through the core may be caused by maintaining a superatmospheric pressure at the gas inlet or a subatmospheric pressure at the gas outlet. The combination of both methods and the control of the rate at which the gas leaves the core of the electrode enables the electrolyte to be conveyed out of the electrode at a higher or lower rate by means of the gas supplied. The same pumping action can also be obtained, of course, with a gas which is liberated at the electrode core. In both cases a control is also possible by a variation of discharge head.

What we claim is:

1. A multi-purpose electrode for electro-chemical processes, which comprises a porous electrode core consisting of a solid mass of agglomerated conductive particles and of substantially uniform density throughout and provided with a firmly adherent porous coating which consists of conductive particles, the coating having pores the mean diameters of which are less than the mean diameters of the interstices between the particles forming the core, the core being formed with separate spaced ducts which terminate within the body of the core, and means for supplying fluid to one duct to cause it to permeate the material of the electrode and for withdrawing fluid from the other duct whereby all of the fluid passes through the material of the core, the pores in the covering being of such size as to block the escape of gas into the electrolyte without preventing the penetration of the electrolyte into the core.

2. A multi-purpose electrode as defined by claim 1, in which the ducts are aligned substantially parallel to the surface of the electrode exposed to the electrolyte.

3. An electrode according to claim 1, in which the electrode core consists of particles which are preferably of approximately spherical shape and 1–300 microns in diameter.

References Cited in the file of this patent

UNITED STATES PATENTS

| | | |
|---|---|---|
| 586,236 | Hulin | July 13, 1897 |
| 2,097,077 | Oppenheim | Oct. 26, 1937 |
| 2,273,036 | Heise et al. | Feb. 17, 1942 |
| 2,275,281 | Berl | Mar. 3, 1942 |
| 2,358,419 | Schumacher et al. | Sept. 19, 1944 |
| 2,592,144 | Howell | Apr. 8, 1952 |
| 2,716,670 | Bacon | Aug. 30, 1955 |

FOREIGN PATENTS

| | | |
|---|---|---|
| 667,298 | Great Britain | Feb. 27, 1952 |